US008245296B2

(12) United States Patent
Archer et al.

(10) Patent No.: US 8,245,296 B2
(45) Date of Patent: Aug. 14, 2012

(54) MALWARE DETECTION DEVICE

(75) Inventors: Steven T. Archer, Dallas, TX (US); Paul V. Hubner, McKinney, TX (US); Kristopher A. Pate, Sachse, TX (US); Francisco A. Dias, Krum, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1062 days.

(21) Appl. No.: 12/126,571

(22) Filed: May 23, 2008

(65) Prior Publication Data

US 2009/0293126 A1 Nov. 26, 2009

(51) Int. Cl.
*G06F 11/00* (2006.01)
*G06F 7/04* (2006.01)

(52) U.S. Cl. ............... 726/22; 726/24; 726/26; 713/188; 713/189

(58) Field of Classification Search .................... 726/24, 726/22
See application file for complete search history.

(56) References Cited

U.S. PATENT DOCUMENTS

| 6,721,424 | B1* | 4/2004 | Radatti ........................ 380/286 |
| 2002/0105253 | A1* | 8/2002 | Diaz et al. .................. 312/265.6 |
| 2003/0120951 | A1* | 6/2003 | Gartside et al. ............... 713/201 |
| 2005/0216559 | A1* | 9/2005 | Manion et al. ................ 709/205 |
| 2006/0161984 | A1* | 7/2006 | Phillips et al. .................. 726/24 |
| 2008/0005782 | A1* | 1/2008 | Aziz ................................ 726/3 |
| 2008/0127347 | A1* | 5/2008 | Benton et al. .................. 726/24 |
| 2008/0222532 | A1* | 9/2008 | Mester et al. ................. 715/738 |

* cited by examiner

*Primary Examiner* — Taghi Arani
*Assistant Examiner* — Mohammad Rahman

(57) ABSTRACT

An exemplary malware detection device includes a data pathway provided between a first data transfer device and a second data transfer device and a processor attached to the data pathway. A memory accessible by the processor contains at least one malware signature and instructions for controlling the processor to interconnect the first and second data transfer devices, direct at least a portion of a data transfer across the data pathway to the processor for analysis, independently analyze the portion of the data transfer using the malware signature, identify malware contained in the portion of the data transfer, and interrupt the data transfer based on the identification of malware.

18 Claims, 4 Drawing Sheets

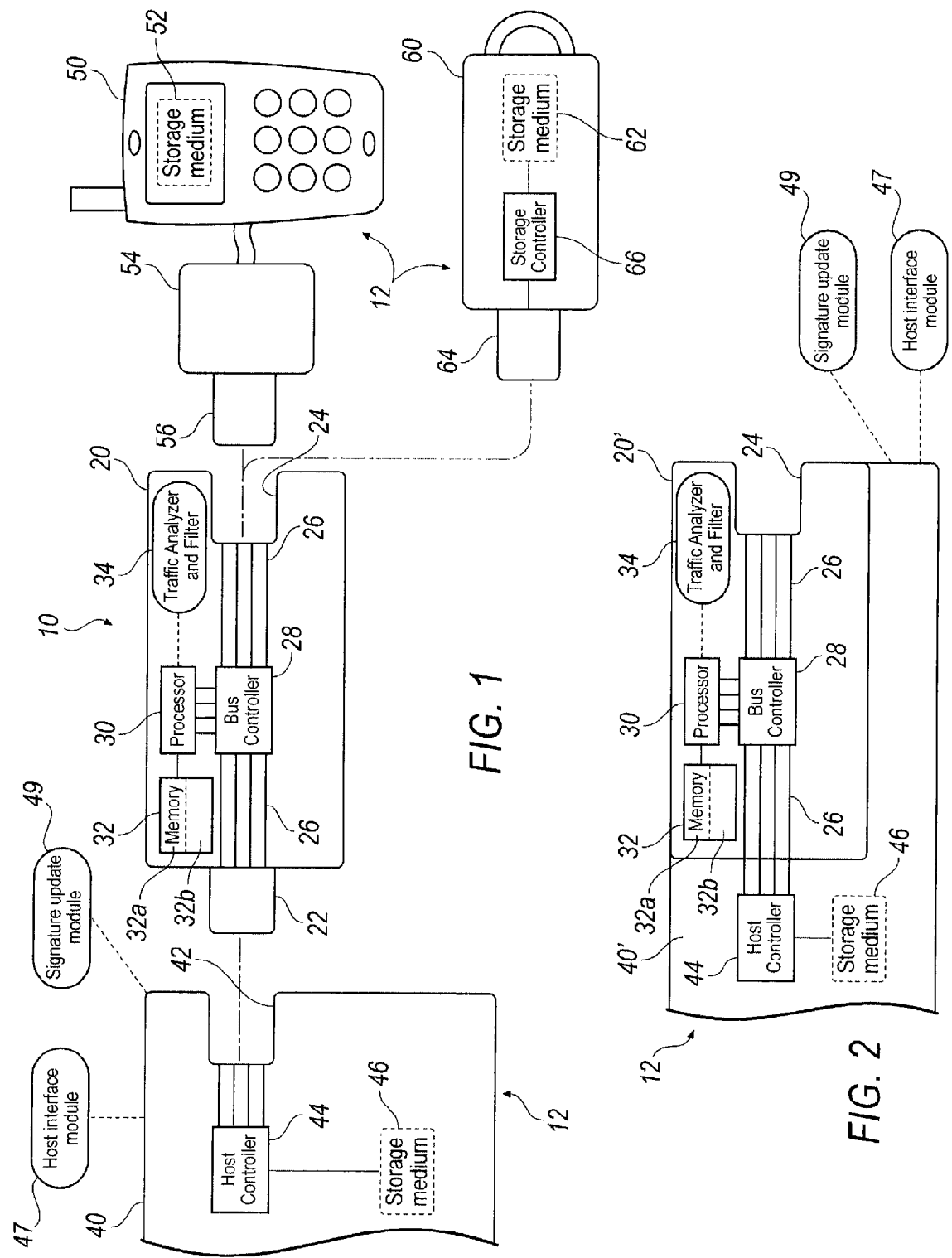

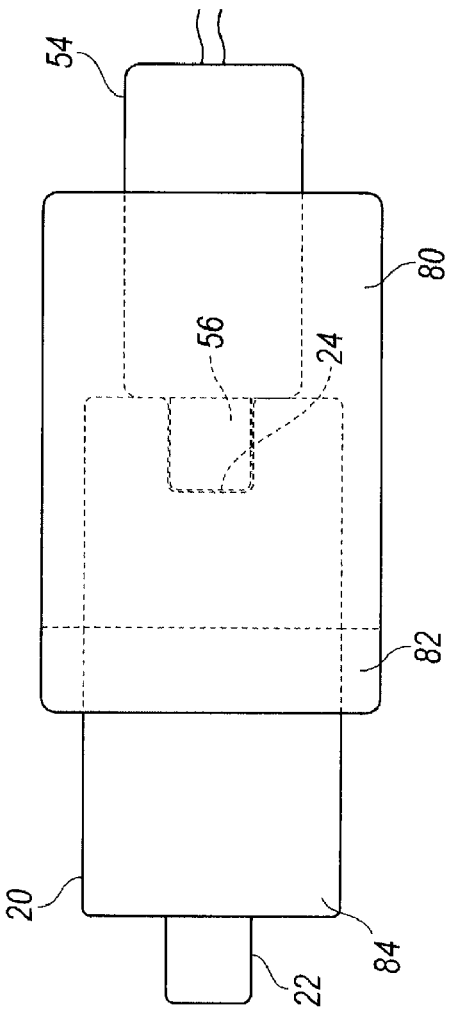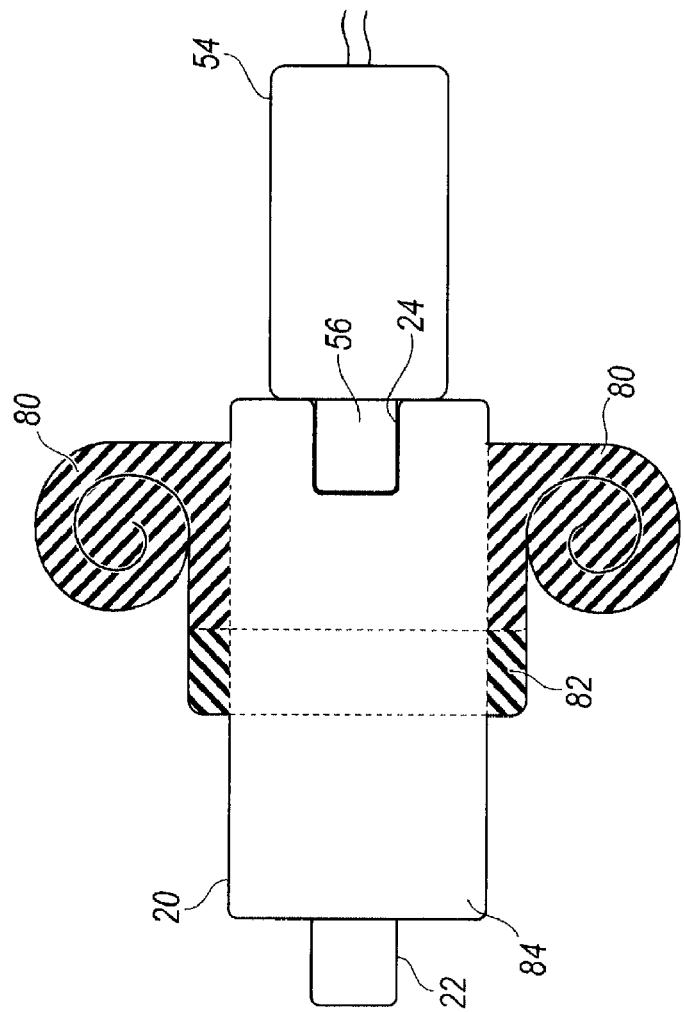
FIG. 3A
FIG. 3B

MALWARE DETECTION DEVICE

BACKGROUND

Malicious software, known as malware, may be defined broadly as any computer data file or data stream that, when directed at a computer system, acts contrary to the interest of the system owner or operator. Malware may be categorized as any of a number of subclasses including computer viruses, worms, trojan horses, rootkits, spyware, etc. The term computer virus is often used synonymously with malware even when used to describe malware that is not generally classified as a virus. Malware detection software may be able to remove malware that is already present on a computer system. However, malware detection software may not provide a physical barrier for blocking malware from reaching the computer system.

BRIEF DESCRIPTION OF THE DRAWINGS

FIG. 1 is a system diagram of an exemplary malware detection device and data transfer devices;

FIG. 2 is a system diagram of another exemplary malware detection device embedded into a host data transfer device;

FIG. 3a depicts an exemplary malware detection device including a sleeve securing the attachment of a data transfer device;

FIG. 3b is a partial view of the sleeve of FIG. 3a in a rolled configuration;

DETAILED DESCRIPTION

Figure 4:
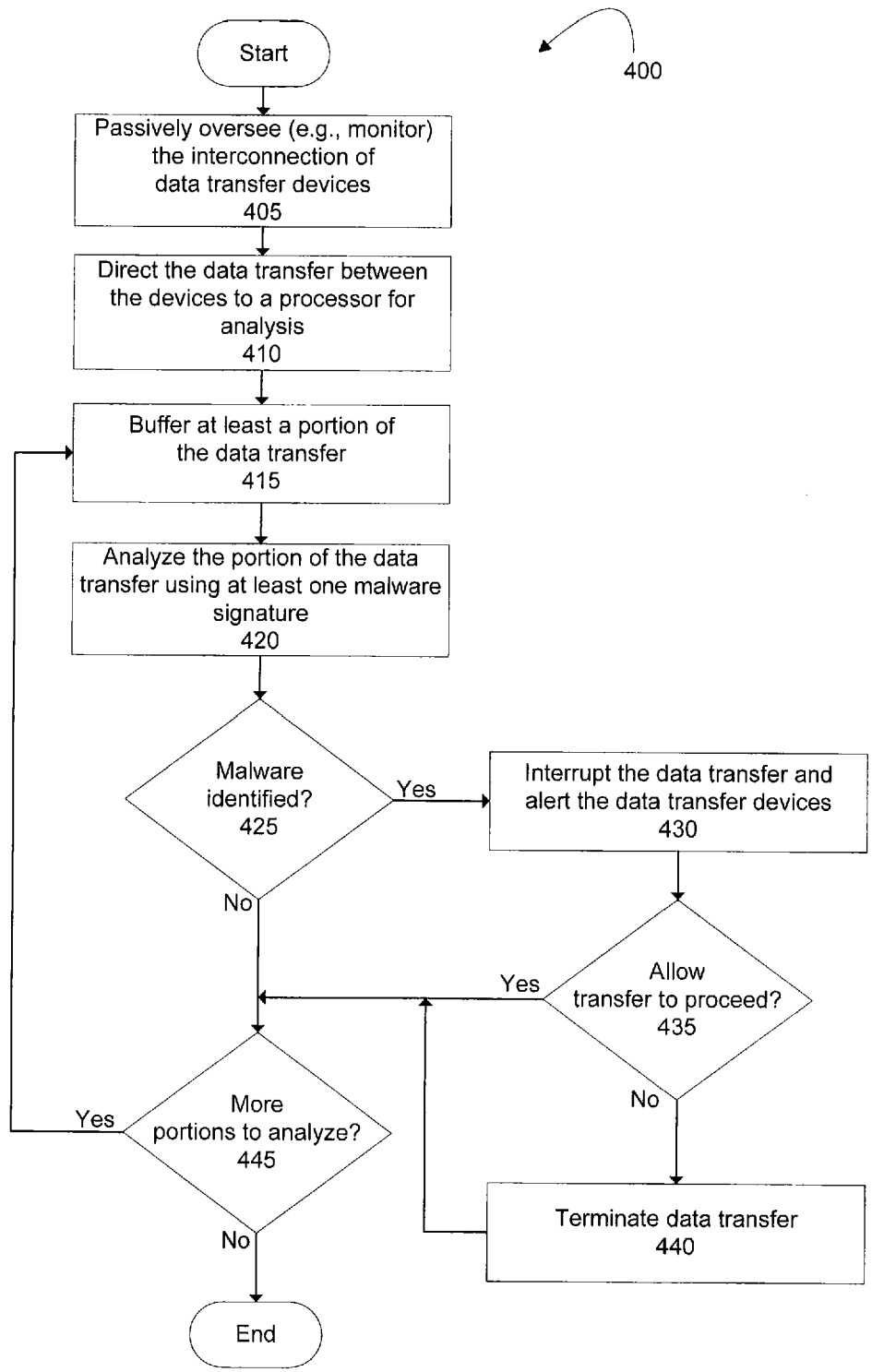
FIG. 4 is a flowchart depicting exemplary steps and decisions related to a malware detection process.

The present disclosure relates to a malware detection device and particularly to a device for directly interconnecting data transfer devices and independently monitoring data transmissions therebetween for malware.

Exemplary illustrations of a malware detection device are described below. In the interest of clarity, not all features of an actual implementation are described in this specification. It will of course be appreciated that in the development of any such actual illustration, numerous implementation-specific decisions must be made to achieve the developers' specific goals, such as compliance with system-related and business-related constraints that will vary from one implementation to another. Moreover, it will be appreciated that such a development effort might be complex and time-consuming, but would nevertheless be a routine undertaking for those of ordinary skill in the art having the benefit of this disclosure.

Referring now to the drawings wherein like numerals indicate like or corresponding parts throughout the several views, representative examples are illustrated.

FIG. 1 illustrates an exemplary system 10 of data transfer devices 12 and a malware detection device 20. The malware detection device 20 provides a discrete and isolated area to analyze data transfers between data transfer devices 12. As will be discussed in more detail below, the malware detection device 20 may implement independent authority in determining whether a data transmission includes malware. The malware detection device may allow for bi-directional data transfers such that the data transfer devices 12 may be both data receivers and data senders. Upon identification, malware may be prevented from ever reaching the data transfer device 12 acting as the data receiver.

The malware detection device physically intervenes between data transfer devices 12 by providing connection points, which may include a connector 22 and a port 24. The connector 22 and port 24 may be interconnected by a data pathway 26 configured to allow data transfers between the data transfer devices 12. A bus controller 28 may regulate the data pathway 26 and interface with a processor 30. The bus controller 28 may segment the data pathway into multiple segments, e.g., a first and second segment on respective sides of the controller 28. Further, the bus controller 28 itself may be considered part of the data pathway 26. The processor 30 may buffer data transfers in a memory 32 and implement a traffic analyzer and filter on the data transfer to independently identify malware. Malware signatures and heuristics used by the traffic analyzer and filter may also be stored in the memory 32. As will be discussed in more detail below, the memory 32 may be divided into one or more other segments 32a, 32b. Additionally, the device may include additional storage mediums (not shown) for storing malware signatures and heuristics while not being active used by the processor 30. For example, the processor 30 may retrieve a subset of the malware signatures from another storage medium (not shown) to temporarily store in the memory 32 while analyzing a data transfer.

Exemplary data transfer devices 12 may include a host computer system 40, a mobile communication device 50, and a data storage unit such as a flash memory drive 60. The host computer system 40 may include a port 42 which generally corresponds to the same interface standards as the connector 22 of the malware detection device 20. A host controller 44 for communicating with peripheral devices, such as the malware detection device 20 and other data transfer devices 12, may be connected to the port 42. A storage medium 46 for storing data may be connected directly or indirectly to the host controller 44. The host controller 44 may manage the transfer of data between peripheral devices and the storage medium 46. A host interface module 47 may provide software instructions for interfacing the host computer 40 with the malware detection device 20. The host interface module 47 may include low level instructions such as hardware drivers and the like, as well as user level software. The host interface module 47 may include instructions for using the malware detection device 20 as a peripheral device or alternatively as a passive device such as a hub for other devices 12. A signature update module 49 may include instructions for passing updated malware signatures and heuristics that have been retrieved from a remote server to the malware detection device 20. Additional components and circuitry of the host computer 40 are omitted for simplicity of illustration.

The mobile communication device 50 may be any type of radio based communication device such as a cell phone, smart phone, Personal Digital Assistant (PDA), hand-held computer, etc. The mobile communication device 50 may include a storage medium 52 for storing data. As mobile communication devices 50 continue to evolve into mobile computing platforms, the possibility of malware infections increases. Accordingly, the device 20 may provide as much protection to the mobile communication device 50 as is provided to the host computer 40. The mobile communication devices may include a plug 54 with a connector 56 for connecting to a host computer 40. Providing the connector 56 on the plug 54 may facilitate the coupling of the mobile communication device 50 to the malware detection device 20. However, other mobile communication devices 50 may position the connector 56 directly on the device 50 and omit the plug 54.

The flash memory drive 60 may be any type of portable or removable data storage unit containing a storage medium 62 including flash memory, or the like. Flash memory drives may be commonly referred to as thumb drives and Universal Serial Bus (USB) drives. However, the flash memory drive 60 may be any removable storage unit including the storage medium 62, a connector 64, and a storage controller 66 for interfacing the storage medium 62 with the a host (e.g., the host computer 40).

Generally, any device with a storage medium and the ability to communicate with other devices to read and/or write data to the storage medium may be considered a data transfer device 12. Other non-illustrated examples of data transfer devices include magnetic or optical storage drives, media players such as digital music players, PDAs, etc. Each data transfer devices 12 generally stores digital data and may be configured to share this data with other devices 12. To conduct a data transfer the data transfer devices 12 may be physically coupled with one or more other devices 12. For instance, the host computer system 40 may be configured to couple with the mobile communication device 50.

Sharing files and data between data transfer devices 12 introduces the risk of spreading malware. While malware detection software may be present on some computer systems, use of such software is not universal. Moreover, users may not be careful about avoiding the use of a data transfer device 12 with a computer system that lacks malware detection software. Accordingly, a data transfer device 12 may become infected with malware when used to share files with a device that lacks malware protection.

Even when present, malware detection software may not adequately protect a computer system from malware contained on a data transfer device 12. For instance, data transfer devices 12 may include synchronization techniques that are not subject to review by malware detection software. Moreover, malware detection software may not be updated frequently enough to cope with new types of data transfer devices 12 that become available. Malware detection software may also be targeted and disabled by so-called anti-anti-malware. Because of these numerous limitations, malware detection software on the host computer 40 should be considered a last resort to dealing with malware infections. Preventing malware from entering the computer system 40 may provide additional protection beyond that provided by malware detection software.

The host computer 40 may include many general purpose software programs and features that each present a possible vector for malware attacks and infection. One approach to reducing malware infections involves reducing the available vectors. However, reducing the available vectors on the computer system 40 may result in an undesirable reduction in functionality. Accordingly, the malware detection device 20 may provide less functionality than the computer system 40 to reduce the possible vectors for malware infection.

The data transfer devices 12 may be susceptible to malware infections from sources other than traditional computer systems. For instance, the mobile communication device 50 may receive malware from other mobile devices. Additionally, the mobile communication device 50 may be configured to wirelessly connect to internet hosts such as web servers, which may serve malware. The flash memory drive 60 may be used with computer accessories that may act as carriers for malware such as printers, digital cameras, digital photo frames, etc. Because such computer accessories may not be designed with security in mind, they may provide targets for malware attacks and infections.

Accordingly, the data transfer devices 12 are all susceptible to malware. Data transfer devices 12 may act as carriers of malware that targets the host computer 40. Accordingly, the malware detection device 20 physically intervenes between the connection of data transfer devices 12 to prevent the transfer of malware. The malware detection device 20, therefore, isolates data transfer devices 12 from each other, e.g., separating the host computer 40 from the flash memory drive 60. The malware detection device may analyze data transfers bi-directionally. For example, if the host computer system 40 becomes infected, the malware may be localized and prevented from transferring to other data transfer devices 12.

Attachment points including the connector 22 and the port 24 may be configured to physically couple to the data transfer devices 12. In one exemplary approach, the connector 22 corresponds to the connectors 56, 64 of data transfer devices 50, 60. However, in other exemplary approaches, the connector 22 and port 24 may be configured for different communication standards or different physical form factors of the same communication standard. For example, an IEEE 1394 connector 22 may be provided along with a USB port 24. Similarly, a standard USB connector 22 may be provided along with a USB-Mini port 24. In an approach using different communication standards, the device 20 may further act as an adaptor for the data transfer devices 12. Accordingly, the device 20 may be configured to physically intervene between the connections of the data transfer devices 12.

The data pathway 26 may allow for bi-directional data transfers from a first data transfer device 12 (e.g. the mobile communication device 50) and a second data transfer device 12 (e.g. the host computer system 40). The data pathway 26 may be physically isolated from the data transfer devices 12 and, therefore, may be considered a discrete data pathway 26. The device 20 may include any of numerous types of data pathways 26. In one exemplary approach, the data pathway 26 may be a point-to-point connection between unaddressed data transfer devices 12. In another exemplary approach, the data pathway 26 may be a host-controlled bus between addressable data transfer devices 12. In another exemplary approach, data transfer devices 12 may communicate in a peer-to-peer manner. In generally, the data pathway 26 may operate according to a peripheral bus standard, such as USB, IEEE 1394, etc. The depiction of the single port 24 and connector 22 merely simplifies the illustration and is not intended to limit the malware detection device 20 to a single port or connector. For instance, the device 20 may include multiple ports 24 or connectors 22 to further act as a hub for multiple data transfer devices 12 as wells as other devices (not shown) that communicate according to the same bus technology.

The bus controller 28 may regulate the data transfer across the data pathway 26. The bus controller may determine when the data transfer devices 12 can communicate across the data pathway 26. In another exemplary approach that provides multiple ports 24 or connectors 22 for connecting multiple data transfer devices 12, the bus controller may regulate the communications among the data transfer devices 12 over the data pathway 26. However, a point-to-point based data pathway 26 may not require a bus controller.

The processor 30 may be a general purpose processor capable of being programmed one or more times with software instructions. For example, the memory 32 accessible to the processor 30 may include instructions implementing the traffic analyzer and filter 34. The processor 30 may be responsible for monitoring the data pathway 26 to determine the existence of malware in at least a portion of any data transmissions. By including the processor 30, the malware detection device 20 may operate independently from the data transfer devices 12. Independent operation may reduce the spread of malware between data transfer devices 12. For example, malware may take full or partial control over the host computer system 40. Accordingly, relying on the processor of the host computer system 40 could render the malware detection device 20 useless if the host computer system 40 has been subverted by malware. In one exemplary approach, the processor 30 may be a distinct element from the bus controller 28. However, other exemplary approaches may combine the functionality of the processor 30 and the bus controller 28 into a single processing element. Moreover, additional processing elements, such as a memory controller, may be included with the malware detection device 20.

The processor 30 may use malware signatures to identify the presence of malware in a data transfer over the data pathway 26. In one exemplary approach, the signatures may include indicia of malware such as file names, copies of malware files, hash codes of malware files, etc.

In another exemplary approach, the malware signatures may include malware heuristics. Malware heuristics include patterns that are common to malware files and programs. For example, malware heuristics may include a particular sequence of commands with little or no use to a normal program. While signatures based on malware indicia may require prior knowledge of malware, malware heuristics may be able to identify new malware that has not been previously identified.

In one exemplary approach, the processor 30 may buffer the data transfer between the data transfer devices 12. For example, the processor 30 may cause at least a portion of the data transfer to be stored. The memory 32 may be divided into an instruction memory 32a and a buffer memory 32b. However, in another exemplary approach, separate physical memory elements may provide the instruction memory 32a and the buffer memory 32b. Buffering may facilitate the comparison of the data transfer to the malware signatures and heuristics. Additionally, buffering may allow for the interruption of the data transfer prior to malware crossing between the data transfer devices 12. Accordingly, the malware detection device 20 may analyze the data transfer independently and in isolation from the host computer system 40.

In one exemplary approach, the independent control of the malware detection device 20 by processor 30 is absolute. If malware is detected in a data transfer, the malware detection device 20 may have sole authority to terminate the transfer or even delete the malware from the transfer. However, in another exemplary approach, the control may be shared between the malware detection device 20 and a host interface module 47 on the data transfer device 12. For example, upon the identification of malware, the host interface module 47 may prompt an operator to determine whether the data transfer should be allowed to continue. The host interface module 47 may also accept preset overrides to automatically determine whether a data transfer including identified malware should be allowed to continue. Such overrides may assist with benign data that is improperly identified as malware. The host interface module 47, or equivalent, may also be included on the mobile communication device 50 as well as other data transfer devices 12 with computing capabilities.

FIG. 2 illustrates another exemplary malware detection device 20'. The malware detection device 20' includes similar elements discussed above with respect to FIG. 1. However, device 20' may be embedded into a data transfer device 12 such as a host computer system 40'. In one exemplary approach, connector 22 may be omitted such that the data pathway 26 may be associated with an expansion or peripheral interface, such as the host controller 48. For example, the device 20' may be directly wired to the host controller 48. In another exemplary approach, the device 20' may include leads (not shown) to connect with an expansion slot. Despite being embedded in the host computer 40', the malware detection device 20' may include a processor 30 to conduct independent analyses of data transfers over the data pathway 26. Moreover, the malware detection device 20', including the data pathway 26, processor 30, and memory 32, provides an isolated area to analyze data transfers for malware. Data transfers including identified malware may be interrupted and terminated prior to reaching the storage medium 46 of the host computer 40'.

The host computers 40, 40' may be any general purpose computing device, such as a PC, or a specialized device. The host computers 40, 40' may have software, such as an operating system with low-level driver software, and the like, for communicating with peripheral devices such as data transfer devices 12. The operating system may also include a network protocol stack, for establishing network connections to a remote server for receiving updated malware signatures and heuristics.

Data transfer devices 12 and malware detection device 20 may employ any of a number of user-level and embedded operating systems known to those skilled in the art, including, but by no means limited to, known versions and/or varieties of the Microsoft Windows® operating system, the Unix operating system (e.g., the Solaris® operating system distributed by Sun Microsystems of Menlo Park, Calif.), the AIX UNIX operating system distributed by International Business Machines of Armonk, N.Y., and the Linux operating system. Computing devices may include any one of a number of computing devices known to those skilled in the art, including, without limitation, a computer workstation, a desktop, notebook, laptop, or handheld computer, or some other computing device known to those skilled in the art.

Data transfer devices 12 and malware detection device 20 may each include instructions executable by one or more processing elements such as those listed above. Computer-executable instructions may be compiled or interpreted from computer programs created using a variety of programming languages and/or technologies known to those skilled in the art, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable medium (e.g., memory 32, storage mediums 46, 52, 62, etc.) includes any medium that participates in providing data (e.g., instructions), which may be read by a computer. Such a medium may take many forms, including, but not limited to, non-volatile media, and volatile media. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

FIGS. 3a and 3b illustrate the malware detection device 20 with a sleeve 80 disposed thereon. A first end 82 of the sleeve

80 may be fixedly attached to an outer casing 84 of the malware detection device 20. The end opposing the first end 82 may be free to selectively overlap a portion of the data transfer device 12 (e.g. the plug 54 of the mobile communication device 50). The sleeve may be an elastomeric or rubber material, which tightly embraces the malware detection device 20 and plug 54 in a first configuration. Elastomeric materials typically maintain a constricted state or configuration unless forcefully stretched to adapt to a second configuration. Further, elastomeric materials may resiliently return to their original configuration. Examples of elastomeric materials with respective ISO abbreviations include but are not limited to ethylene propylene (EPM), chloroprene (CR), nitrile rubber (NBR), silicone rubber (Q), etc. The sleeve may be selectively adjusted to a second configuration by rolling the free end upon itself. Accordingly, the sleeve may be used to selectively secure a data transfer device 12, or plug 54 thereof, to the malware detection device 20. The sleeve may prevent an inadvertent interruption of a data transfer by reducing the chances of the data transfer device 12 decoupling from the malware detection device 20.

The malware detection device 20 may implement a process for detecting malware in a data transfer between data transfer devices 12. The process may operate on bidirectional data transfers by analyzing data traversing the data pathway 26 regardless of its origination. Data transmitted over the data pathway 26 may be transferred in small units such as packets. The data transfer device may analyze an entire data transfer or some portion thereof such as an individual file, one or more packets of data, etc. Accordingly, the data transfer may be analyzed on a packet-by-packet basis. In one exemplary approach, the malware detection device 20 may be configured to analyze all data packets. In another exemplary approach, packets related to device communication such as protocol handshakes and other administrative communications may be ignored.

FIG. 4 illustrates a flowchart of an exemplary process 400 for detecting malware in a data transfer between data transfer devices 12. The detection device 20 may include a computer-readable medium having stored instructions for carrying out certain operations described herein, including some or all of the operations described with respect to process 400. For example, some or all of such instructions may be included in the traffic analyzer and filter 34. Some steps of process 400 may include user input and interactions. However, it is to be understood that fully automated or other types of programmatic techniques may implement steps that include user input.

The process 400 begins in step 405 in which the malware detection device 20 passively oversees (e.g., by monitoring) the interconnection of the data transfer devices 12. When data transfer devices 12 are attached to each of the connection points 22, 24, the detection device 20 may act as a passive bridge or hub. In this capacity, the malware detection device 20 may provide a communication medium over the data pathway 26 between the data transfer devices 12. Moreover, the malware detection device 20 itself may not be recognized as peripheral device. For example, the host computer 40 may recognize the mobile communication device 50 as the only connected peripheral. The controllers 28, 44, 66 of the devices may coordinate the communications between the devices according to the predetermined protocol (e.g., USB, IEEE 1394, etc.). However, any input from controller 28 may be limited to merely the normal operation of the data pathway 26. At this point, the malware detection device 20 passively oversees the interconnection of the data transfer devices 12 without exerting any influence over the devices 12 or the data transfer. In this passive arrangement, the data transfer devices 12 are free to negotiate a file transfer with each other without interference from the malware detection device 20. The device 20 maintains its passive capacity until such time that malware is detected as will be discussed below.

Next, in step 410, at least a portion of a data transfer over the data pathway between the data transfer devices may be directed to the processor 30 for analysis. The bus controller 28 may direct data from the data pathway 26 to the processor 30 and/or memory 32. The data pathway 26 in cooperation with the processor 30 and bus controller 28 may provide an isolated area to analyze a data transfer. While physically connected, directly or indirectly, the data pathway 26 may be considered to be isolated from the data transfer devices 12 due to the ability of the independent processor 30 to interrupt a data transfer that includes malware.

Next, in step 415, the data transfer may be buffered. At least a portion of the data transfer may be temporarily stored in the memory 32. In one exemplary approach, the processor 30 and bus controller 28 may cooperatively store the portion of the data transfer in the memory 32. In another exemplary approach (not illustrated), the bus controller 28 may directly connect to the memory 32 to store the portion of the data transfer. The amount of data that is buffered may vary. In one exemplary approach, only a single packet of data may be buffered. Each packet of data may be read from the data pathway 26, buffered, and analyzed prior to reading the next packet of data. In another exemplary approach, data may be buffered based on logical separations such as end of file markers.

Next, in step 420, the data transfer may be analyzed using malware signatures. The use of malware signatures and malware heuristics may be based on the amount of data buffered in step 415. Malware signatures may require entire files to be buffered for analysis. However, malware signatures that include heuristics may be suited to a packet-by-packet analysis of the data. As discussed above, the processor 30 may be configured to independently analyze the data transfer without being influenced by the data transfer devices 12.

Next, in step 425, it may be determined whether malware is identified in the data transfer. When a portion of the data transfer, such as the portion buffered in step 415 above, corresponds to a malware signature or heuristic, malware may be identified. The correspondence may be an exact correspondence such as a match between a malware signature and the buffered data. In another exemplary approach, malware may be identified based on a degree of correspondence between the portion of data and the malware signature exceeding a predetermined threshold. Similarly, malware heuristics may not result in exact correspondence. For example, the identification of malware may be based on a probabilistic determination that a correspondence between the portion of the data transfer and the malware heuristic indicates the existence of malware.

Next, in step 430, the data transfer may be interrupted and the data transfer devices may be alerted to the existence of malware. The malware detection device 20 may communicate with the data transfer devices 12 through the host interface module 47. The host interface module 47 may present the operator with an alert message such as a graphic display in the user interface.

Next, in step 435, it may be determined whether the data transfer should proceed. In one exemplary approach, the operator may be given the opportunity to allow the data transfer to proceed. For example, the alert presented in step 430 may also include a dialogue box or similar user interface element to accept a decision of the operator. In another exemplary approach, the interruption may be limited in time. The data transfer may automatically proceed at the end of the time period if the operator hasn't indicated a decision. In another exemplary approach, the host interface module 47 may be configured with alert overrides. Overrides may accommodate data transfers that are improperly identified as malware. Through the use of overrides, the malware detection device 20 in cooperation with the host interface module 47 may automatically determine that the data transfer should proceed.

Based on the determination in step 435, the interrupted data transfer may be terminated in step 440. If any data was successfully transferred prior to the termination, the malware detection device 20 may instruct the recipient data transfer device 12 to delete or quarantine the acquired data. Similarly, the malware detection device 20 may instruct the initiating data transfer device 12 to delete or quarantine the transmitted data.

In step 445, it may be determined whether there are more portions of the data transfer to analyze. As discussed above, the data transfer may include multiple portions, such as packets, files, etc. If there are more portions to analyze, the process may return to step 415.

Following a determination in step 445 that there are no more portions to analyze, process 400 may end.

Malware is known to change and evolve over time. Additionally, new malware is regularly created and spread. Accordingly, the malware signatures and heuristics may become outdated. Updated signatures may need to be provided to the malware detection device 20 to identify new and altered malware. Updating the signatures may be a sensitive operation that requires access to the memory 32 of the malware detection device 20. Accordingly, updating the signatures may be limited to a secure updating application (e.g., the signature update module 49) and may require security precautions such as administrator level access rights. In one exemplary approach, the signature update module 49 may only be available on certain data transfer devices 12 (e.g. a trusted computer such as an administrator computer, or the like). In another exemplary approach, digital certificates and similar security techniques may allow the signature update module 49 to operate on any data transfer device 12 that can communicate with a remote server that maintains updated signatures. Additionally, the signature update module 49 may allow the malware detection device 20 to commandeer and direct the data transfer device 12 to download and transfer the updated signatures.

Figure 5:
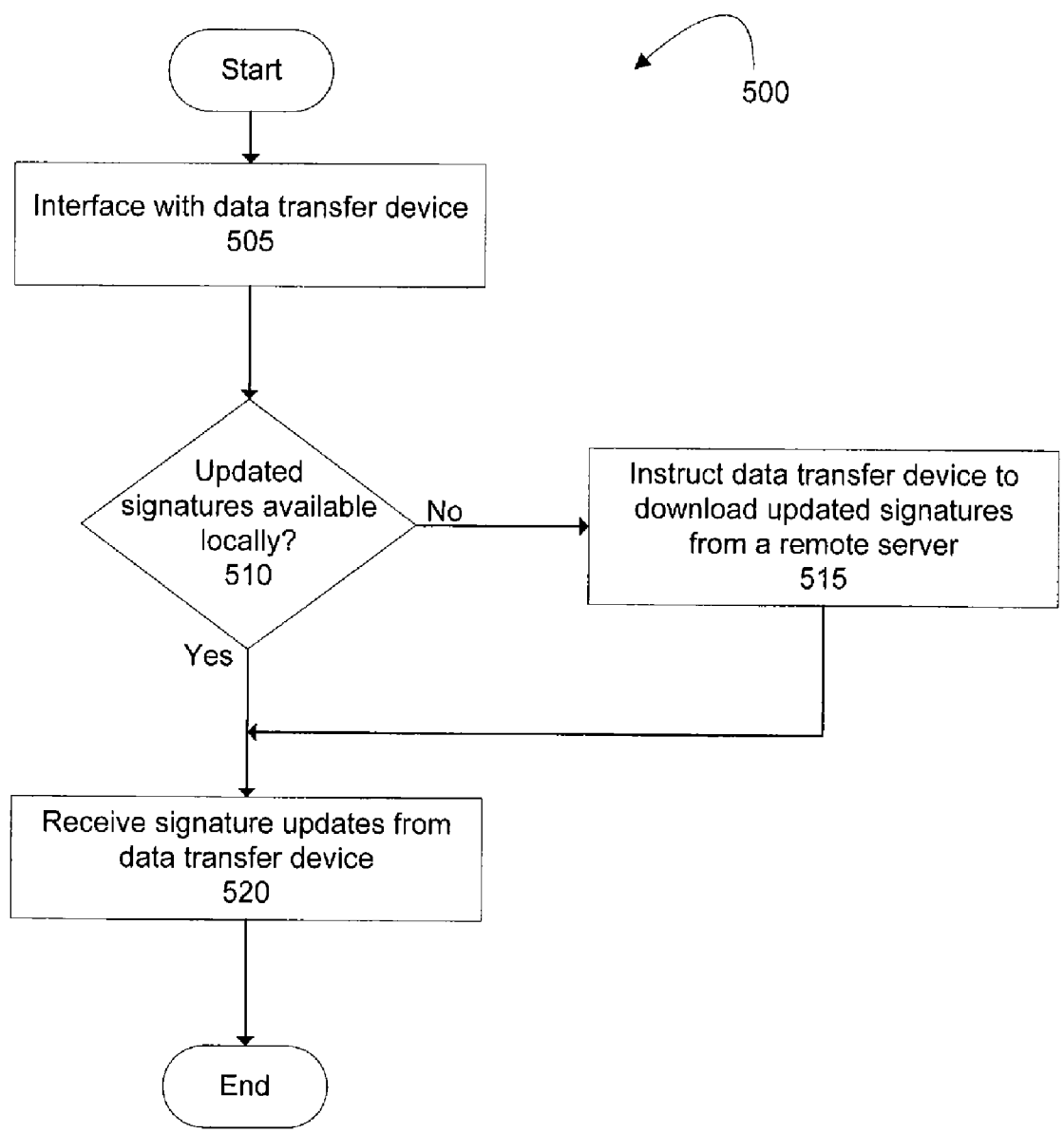
FIG. 5 is a flowchart depicting exemplary steps and decisions related to a malware signature updating process.

FIG. 5 illustrates a flowchart of an exemplary process 500 for updating the malware signatures of the device 20. The data transfer device 40 may include a computer-readable medium having stored instructions for carrying out certain operations described herein, including some or all of the operations described with respect to process 500. For example, some or all of such instructions may be included in the signature update module 49. Some steps of process 500 may include user input and interactions. However, it is to be understood that fully automated or other types of programmatic techniques may implement steps that include user input.

Process 500 begins in step 505 when the malware detection device 20 interfaces with the data transfer device 12. The physical coupling of the devices 12, 20 may activate the signature update module 49. As discussed above, the signature update module 49 may implement one or more security precautions such as administrative access rights, digital signature validation, etc. Regardless of which, if any, security precautions are implemented, the interfacing may allow the malware detection device 20 to commandeer and direct the operations of the data transfer device 12.

Next, in step 510, it may be determined whether the updated signatures are available locally from the data transfer device 12. For example, the data transfer device 12 may be configured to periodically download updated signatures from a remote server. In another exemplary approach, the data transfer device 12 may be configured to provide updated signatures to a plurality of malware detection devices 20. For example, an IT administrator may manage a plurality of malware detection devices 20 for an organization. The updated signatures may be downloaded once and then provided to each malware detection device 20.

If the updated signatures are not available locally, the data transfer device may be instructed to download the updated signatures from a remote server in step 515. For example, the malware detection device may instruct the operating system of the data transfer device 12 to initiate a network connection with a remote server. As discussed above, digital certificates, or the like, may be used to provide a degree of trust and security between the data transfer device 12 and the remote server.

Next, in step 520, the updated signatures may be transferred to the malware detection device 20. For example, the processor 30 may read the updated signatures from data transfer device 12. The updated signatures may be stored by the processor 30 in the memory 32. As discussed above, a subset of the memory 32a may be set aside to hold the malware signatures.

Following step 520, process 500 may end.

Accordingly, an exemplary malware detection device 20 has been described. The malware detection device 20 provides an isolated and discrete area to analyze data transfers between data transfer devices 12. The analysis of data transfers may be based on malware signatures including heuristics. The independent processor 30 of the device 20 may interrupt and terminate data transfers based on the identification of malware. The malware detection device 20 may also interface with a data transfer device 12 to receive updates to the malware signatures.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain systems, and should in no way be construed so as to limit the claimed invention.

Accordingly, it is to be understood that the above description is intended to be illustrative and not restrictive. Many systems and applications other than the examples provided would be apparent upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future systems. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary is made herein. In particular, use of the singular articles such as "a," "the," "said," etc. should be read to recite one or more of the indicated elements unless a claim recites explicitly to the contrary.

What is claimed is:

1. A device, comprising:
   a memory to store instructions; and
   a processor to execute the instructions to:
      monitor data transmission between a first device and a second device, the data being transmitted via a pathway, and the pathway being a host-controlled peripheral bus, a peer-to-peer bus, or a point-to-point link;
      analyze, using one or more malware signatures, the data transmitted between the first device and the second device;
      determine, based on the one or malware signatures, if malware is contained in the data;
      interrupt, when malware is contained in the data, transmission of the data between the first device and the second device;
      receive, from the first device or the second device, one or more updated malware signatures;
      analyze, using the one or more updated malware signatures, subsequent data transmitted between the first device and the second device;
      determine, based on the one or more updated malware signatures, if malware is contained in the subsequent data; and
      interrupt, when malware is contained in the subsequent data, transmission of the subsequent data between the first device and the second device.

2. The device according to claim 1, where the at least one malware signature includes at least one malware heuristic.

3. The device according to claim 1, where the first device and the second device are each one of a computing system, a data storage unit, or a mobile communication device.

4. The device according to claim 1, where the device is coupled to the first device and the second device.

5. The device according to claim 1, further comprising a sleeve that secures an attachment of the device to at least one of the first device or the second device.

6. The device according to claim 5, where the sleeve is an elastomeric material.

7. A method, comprising:
   monitoring data transmitted between a first device and a second device, the data being transmitted via a pathway, and the pathway being a host-controlled peripheral bus, a peer-to-peer bus, or a point-to-point link;
   analyzing, using one or more malware signatures, the data transmitted between the first device and the second device;
   determining, based on the one or more malware signatures, if malware is contained in the data;
   interrupting, when malware is contained in the data, transmission of the data between the first device and the second device;
   receiving, from the first device or the second device, one or more updated malware signatures;
   analyzing, using the one or more updated malware signatures, subsequent data transmitted between the first device and the second device;
   determining, based on the one or more updated malware signatures, if malware is contained in the subsequent data; and
   interrupting, when malware is contained in the subsequent data, transmission of the subsequent data between the first device and the second device.

8. The method according to claim 7, further comprising:
   providing an alert to at least one of the first device or the second device when malware is contained in the data.

9. The method according to claim 7, further comprising:
   buffering at least a portion of the data prior to the analyzing.

10. The method according to claim 7, further comprising:
    comparing at least a portion of the data to the one or more malware signatures on a packet-by-packet basis.

11. A non-transitory computer-readable storage medium comprising:
    one or more instructions which, when executed by at least one processor, cause the at least one processor to analyze, using the one or more malware signatures, data transmitted between a first device and a second device, the data being transmitted via a pathway, and the pathway being a host-controlled peripheral bus, a peer-to-peer bus, or a point-to-point link;
    one or more instructions which, when executed by the at least one processor, cause the at least one processor to determine, based on the one or more malware signatures, if malware is contained in the data;
    one or more instructions which, when executed by the at least one processor, cause the at least one processor to interrupt, when malware is contained in the data, transmission of the data between the first device and the second device;
    one or more instructions which, when executed by the at least one processor, cause the at least one processor to receive, from the first device or the second device, one or more updated malware signatures;
    one or more instructions which, when executed by the at least one processor, cause the at least one processor to analyze, using the one or more updated malware signatures, subsequent data transmitted between the first device and the second device;
    one or more instructions which, when executed by the at least one processor, cause the at least one processor to determine, based on the one or more updated malware signatures, if malware is contained in the subsequent data; and
    one or more instructions which, when executed by the at least one processor, cause the at least one processor to interrupt, when malware is contained in the subsequent data, transmission of the subsequent data between the first device and the second device.

12. The computer-readable storage medium according to claim 11, where the one or more malware signatures includes at least one malware heuristic.

13. The computer-readable storage medium according to claim 11, where the device is coupled to the first device and the second device.

14. The device according to claim 1, where the processor is further to:
    transmit a request, to the first device or the second device, for the one or more updated malware signatures.

15. The device according to claim 14, where the request includes at least one instruction to cause the first device or the second device to initiate, when the one or more updated malware signatures are not available at the first device or the second device, a network connection with a server to obtain the one or more updated malware signatures.

16. The method according to claim 7, further comprising:

transmitting a request, to the first device or the second device, for the one or more updated malware signatures.

17. The method according to claim 16, where the request includes at least one instruction to cause the first device or the second device to initiate, when the one or more updated malware signatures are not available at the first device or the second device, a network connection with a server to obtain the one or more updated malware signatures.

18. The computer-readable storage medium according to claim 11, further comprising:

one or more instructions which, when executed by the at least one processor, cause the at least one processor to transmit a request, to the first device or the second device, for the one or more updated malware signatures, where the request includes at least one instruction to cause the first device or the second device to initiate, when the one or more updated malware signatures are not available at the first device or the second device, a network connection with a server to obtain the one or more updated malware signatures.

\* \* \* \* \*